United States Patent [19]

Ceseri

[11] 4,358,098

[45] Nov. 9, 1982

[54] MOUNTING NUT

[75] Inventor: Anthony Ceseri, Staten Island, N.Y.

[73] Assignee: National Union Electric Corporation, Greenwich, Conn.

[21] Appl. No.: 207,238

[22] Filed: Nov. 17, 1980

[51] Int. Cl.³ .............................................. F16F 7/00
[52] U.S. Cl. ................................................. 267/141.5
[58] Field of Search ............................ 188/379, 382; 267/141.1, 141.3, 141.4, 141.5; 411/360, 907, 908

[56] References Cited

U.S. PATENT DOCUMENTS

| | | | |
|---|---|---|---|
| 2,241,026 | 5/1941 | Wylie | 267/141.5 |
| 2,878,905 | 3/1959 | Langermeier | 411/908 X |
| 3,193,237 | 7/1965 | Adams | 267/141.4 |
| 3,223,374 | 12/1965 | Butler et al. | 267/141.4 |

FOREIGN PATENT DOCUMENTS 887567  8/1943  France ............................ 267/141.5

Primary Examiner—Duane A. Reger
Attorney, Agent, or Firm—Alfred E. Miller

[57] ABSTRACT

A shock mounting assembly has a grommet for holding a plate assembled on a weld stud. The grommet is held on the stud by a unitary plastic nut having a sleeve portion extending through the grommet, a central flange portion extending over the end of the grommet and a shaped end portion, such as a hex head. Initially the nut is not provided with threads, the threads being formed on the inner surface of the sleeve portion by being rotated on the stud during assembly.

14 Claims, 4 Drawing Figures

MOUNTING NUT

This invention relates to mounting systems for equipment, such as shock mounting arrangements for compressors or the like, and is more particularly directed to the provision of a nut adapted for such use. It is of course apparent that the invention is not limited solely to such application.

In a typical resilient mounting system, for example for a compressor for an air conditioner, referring to FIG. 1 of the drawings, the compressor illustrated figuratively by the block 10, has or is mounted on a compressor foot plate 11. The compressor foot plate 11 is shock mounted on a base plate 12 by a plurality of corner shock mounts 13.

The typical construction of such shock mounts, as employed in the past, is illustrated in the cross section of FIG. 2. As illustrated in this figure, a stud 20, which may have an enlarged base 21, is welded to extend upright from the base plate 12. A shock mount 22, for example, of neoprene rubber, is fit over the stud 20, with the bottom end 23 engaging the base plate 12. An annular groove 24 is provided in the base of the grommet 22, to clear the enlarged 21 of the stud. The grommet 22 has an annular recess 25 formed therein, for being received in a suitable aperture of the compressor foot plate 11. In order to permit the grommet to be assembled in the compressor foot plate, its upper diameter may be somewhat reduced, in accordance with conventional practice, to enable the grommet to be snapped in place.

A rigid sleeve 26, for example of metal, extends through the grommet from the enlarged base 21 of the stud to just slightly above the top of the grommet. A flat washer 27 is assembled on top of the sleeve 26, followed by the conventional lock washer 28 and nut 29. The sleeve 26 is thus dimensioned to enable the nut to be tightened thereon, without compressing the grommet.

While the assembly illustrated in FIG. 2 is generally satisfactory from a functional standpoint, it will be noted that a number of parts are required, the assembly requires a number of steps, and the stud must extend for a considerable distance above the base plate, since it must receive the nut. This of course is undesirable from the space standpoint, as well as the additional material required for such an extending structure.

The present invention is therefore directed to providing an improved arrangement for holding a grommet or the like in a mounting system, for example, for a compressor.

Briefly stated, in accordance with the invention, a plastic elongated nut is provided, being devoid of internal threads until assembled. The sleeve extending through the grommet is a part of the nut, and has internal stops. A flange on the nut serves to retain the grommet in position, without the application of axial pressure thereto, if desired. Due to the provision of a unitary nut, the sleeve, lock washer and flat washer of the above known assembly may be omitted, and the overall height of the mounting structure is considerably reduced.

In order that the invention will be more clearly understood, it will now be disclosed in greater detail with reference to the accompanying drawing, wherein.

Figure 3:
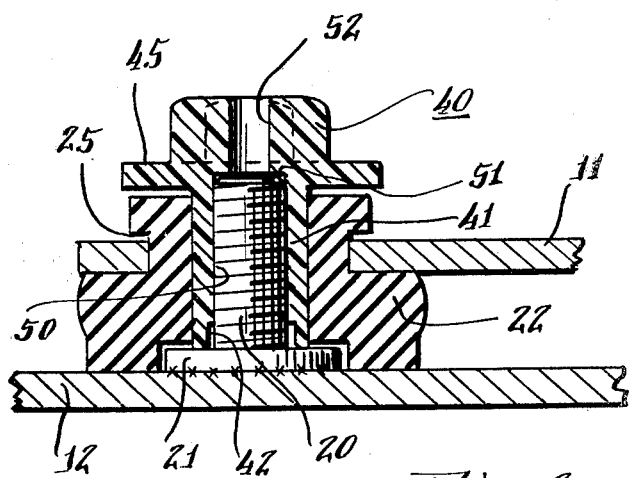
FIG. 3 is an enlarged cross sectional view of a mounting assembly, adaptable for use in the arrangement of FIG. 1, in accordance with one embodiment of the invention.
Figure 4:
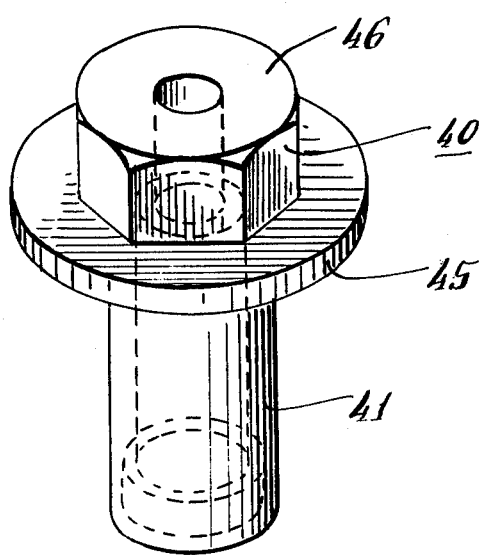
FIG. 4 is a top perspective view of a nut in accordance with the invention.

Referring now to FIG. 3, the assembly in accordance with the invention of course employs the same form of base plate 12 and compressor foot plate 11 as in the prior art, and the grommet 22 may be fashioned in the same manner as in the past.

In accordance with the present invention, however, a nut 40 is provided, having an axially extending sleeve 41 extending through the central hole in the grommet and abutting the enlarged base 21 of the stud 20. In the system of the invention, the stud 20 is threaded substantially completely to its base as illustrated. An annular recess 42 is provided in the bottom of the sleeve 41 of the nut to serve as clearance for any enlargement of the stud in this region.

The nut 40 has a radially outwardly extending flange 45 at the upper end of the sleeve 41. The sleeve 41 thus has a length such that, when it is bottomed on the stud, the flange will exert no substantial amount of axial pressure on the grommet, and, in fact, is preferably spaced a nominal distance from the top of the grommet as illustrated. In this way it is evident that the nut 40 may be fully tightened on the stud, without compressing, at least to any significant degree, the grommet.

The upper portion of the nut 40 has a conventional, for example, hex head 46, to permit it to be readily assembled.

Prior to the initial assembly of the nut on the stud, the inside surface 50 of the sleeve 41 of the nut has no threads formed therein, so that the threads of the stud 20 deform the inside surface of the sleeve to form threads therein, upon assembly. As a consequence, the nut of the invention is firmly held to the stud, so that no lock washer is necessary. A radially inwardly extending shoulder 51 is provided at the upper end of the inner surface of the sleeve, to also serve as a stop on the top of the stud. This shoulder 51 may in fact be higher in the nut than the top of the sleeve portion proper thereof, as illustrated. The internal diameter of the nut in the portion 52 thereof above the shoulder is of course less than that of the sleeve portion 50.

Figure 1:
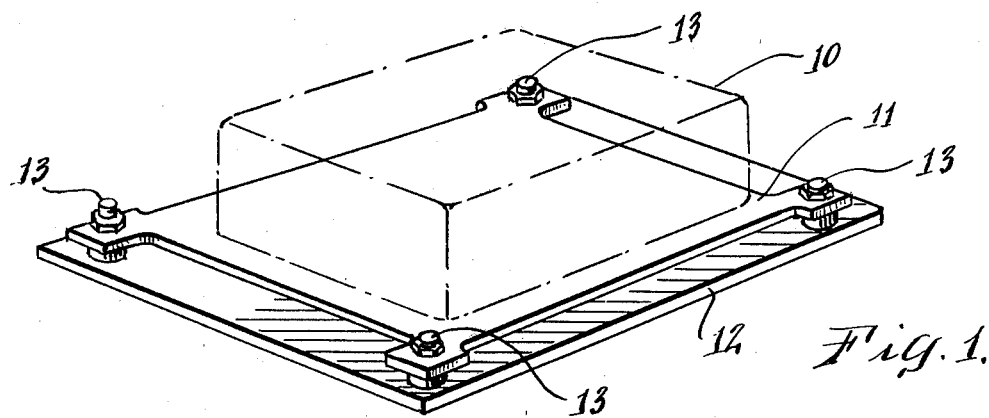
FIG. 1 is a simplified perspective sketch of an application of the mounting elements, both of the prior art and the present invention.
Figure 2:
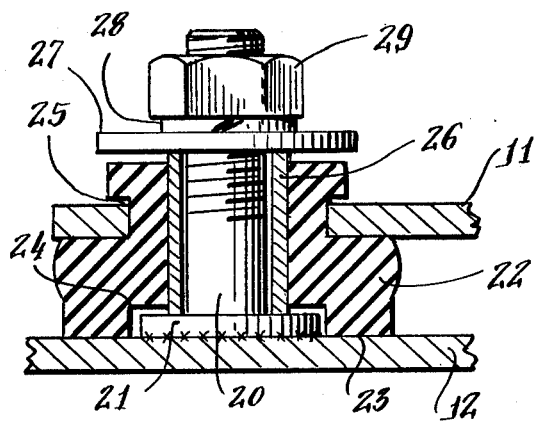
FIG. 2 is an enlarged cross sectional view of a mounting system in accordance with the prior art, as has been previously discussed.

It must be pointed out that, in the arrangement of the invention, the stud 20 need not extend to any considerable distance above the grommet, as shown in FIG. 3, and, in fact may be at substantially the same height as the top of the grommet. As a consequence, comparing the structure of the invention with that of the prior art illustrated in FIG. 2, it is apparent that the overall height of the stud is considerably reduced in accordance with the invention. This of course saves material, as well as desirably reducing the overall height of the structure.

In addition, the invention only requires a single element to be assembled on the stud after the grommet has been placed, thereby omitting the separate sleeve, flat washer and lock nut of the known assembly, as well as the costs of these items. The reduction of components of course also provides the advantage that the assembly time, and hence costs, are also considerably reduced.

The nut, in accordance with the invention, is preferably of a plastic material, such as, but not limited, to Nylon. As a consequence, the invention provides the further advantage that it does not rust. The nut of the invention further enables the standardization of stud lengths, since the same length nut may be employed on all units. As a consequence, the invention permits a larger volume of standardized weld studs to be produced, reducing the price of such elements. The nut in accordance with the invention is much lighter in weight than prior devices, thereby also reducing its costs, from the standpoint of shipping. The cost of the nut in accordance with the invention is hence about half the cost of the four elements required in the prior art mounting system.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. In a mounting assembly including a threaded stud mounted to a base, a grommet surrounding said stud for resiliently supporting an element from said stud, said grommet having an annular recess in its outer surface for receiving said element, and means for retaining said grommet on said stud, the improvement wherein said retaining means comprises a unitary plastic nut having a sleeve portion on one end extending through said grommet and having an internal surface engaging the threads of said stud, a flange portion adjoining said sleeve portion and having an outer diameter to retain said grommet on said stud between said flange and said base, and the other end thereof being shaped to engage a tool for rotating said nut on said stud.

2. The assembly of claim 1 wherein said other end has a hexagonal diameter.

3. The assembly of claim 1 wherein said sleeve has a length to permit tightening of said nut on said stud without any substantial compression of said grommet.

4. The assembly of claim 3 wherein said sleeve portion has a length to provide a space between said flange and said grommet when said nut is fully tightened on said stud.

5. In a mounting assembly including a threaded stud mounted to a base, a grommet for resiliently supporting an element from said stud, and means for retaining said grommet on said stud, the improvement wherein said retaining means comprises a unitary plastic nut having a sleeve portion on one end extending through said grommet and having an external surface engaging the threads of said stud, a flange portion adjoining said sleeve portion and having an outer diameter to retain said grommet on said stud, and the other end thereof being shaped to engage a tool for rotating said nut on said stud, said internal surface of said sleeve portion being initially unthreaded, and being threaded only by having been threaded on said stud, whereby said nut is firmly held on said stud.

6. In a mounting assembly including a threaded stud mounted to a base, a grommet for resiliently supporting an element from said stud, and means for retaining said grommet on said stud, the improvement wherein said retaining means comprises a unitary plastic nut having a sleeve portion on one end extending through said grommet and having an internal surface engaging the threads of said stud, a flange portion adjoining said sleeve portion and having an outer diameter to retain said grommet on said stud, and the other end thereof being shaped to engage a tool for rotating said nut on said stud, said stud having an enlarged base portion adapted to be welded to a base, said stud being fully threaded, said sleeve having a length to fully fit over said threaded portion of said stud and engage the base portion thereof, with substantially no compression of said grommet by the flange thereof, said nut further having a radial inward extending shoulder positioned to engage the exposed end of said stud, to further limit tightening of said nut on said stud.

7. A nut for a shock mount, comprising a unitary plastic element having a radially extending flange, a sleeve portion extending from said flange to one end of said nut, the portion from said flange to the other end thereof being shaped to receive a tool for turning said nut, said sleeve portion having an unthreaded central hole therein extending from said one end to a radially inward extending shoulder within said nut.

8. The nut of claim 7 wherein said portion from said flange to the other end thereof having a hexagonal cross section.

9. The nut of claim 7 wherein said unitary plastic element is of Nylon.

10. The nut of claim 7 wherein said sleeve portion has an annular internal recess at said one end of said nut, said radially extending shoulder being in the region of said nut where said sleeve portion joins said flange, the central hole in said nut extending from said shoulder to said other end of said nut with a reduced diameter, and said portion extending from said flange to said other end of said nut having a hexagonal cross section.

11. The mounting assembly of claim 1 wherein said stud is self threaded in said nut.

12. The mounting assembly of claim 1 wherein the diameter of said flange is greater than the diameter of said annular recess, whereby said nut inhibits removal of said element from said stud.

13. The mounting assembly of claim 1 wherein said grommet is freely removable from said stud when said nut is removed from said stud, whereby said element may be readily installed and removed from said base.

14. The mounting assembly of claim 1 wherein said stud has a flange portion engaging said base, said sleeve portion having a length to space said flange from said grommet when the end of said sleeve portion engages the flange of said stud.

* * * * *